United States Patent
Sun et al.

(10) Patent No.: US 8,820,203 B2
(45) Date of Patent: Sep. 2, 2014

(54) METHOD OF CONTROLLING A ROBOT FOR SMALL SHAPE GENERATION

(75) Inventors: Yi Sun, West Bloomfield, MI (US); H. Dean McGee, Rochester Hills, MI (US); Jason Tsai, Bloomfield Hills, MI (US); Hadi Akeel, Bloomfield Hills, MI (US)

(73) Assignee: Fanuc Robotics America, Inc., Rochester Hills, MI (US)

( * ) Notice: Subject to any disclaimer, the term of this patent is extended or adjusted under 35 U.S.C. 154(b) by 674 days.

(21) Appl. No.: 12/369,266

(22) Filed: Feb. 11, 2009

(65) Prior Publication Data

US 2009/0199690 A1    Aug. 13, 2009

Related U.S. Application Data

(60) Provisional application No. 61/027,627, filed on Feb. 11, 2008.

(51) Int. Cl.
*G05B 19/18* (2006.01)
*G06F 19/00* (2011.01)

(52) U.S. Cl.
USPC ............ 83/49; 700/252; 318/568.21; 901/30; 901/41

(58) Field of Classification Search
USPC .................. 700/245, 254, 252; 219/121.72; 376/261; 180/204; 318/568.21, 568.22, 318/576, 568.2; 395/80, 91; 83/523, 49, 53, 83/39; 901/41, 30
See application file for complete search history.

(56) References Cited

U.S. PATENT DOCUMENTS

| | | | |
|---|---|---|---|
| 4,621,333 A * | 11/1986 | Watanabe | 700/257 |
| 4,831,316 A | 5/1989 | Ishiguro et al. | |
| 4,883,939 A * | 11/1989 | Sagi | 219/125.1 |
| 4,969,722 A | 11/1990 | Akeel | |
| 5,303,333 A * | 4/1994 | Hoos | 700/245 |
| 5,315,222 A * | 5/1994 | Kasagami et al. | 318/568.11 |
| 5,572,103 A * | 11/1996 | Terada | 318/568.13 |
| 6,064,168 A * | 5/2000 | Tao et al. | 318/568.21 |
| 6,853,964 B1 * | 2/2005 | Rockwood et al. | 703/2 |
| 7,209,802 B2 * | 4/2007 | Jerregard et al. | 700/245 |
| 2003/0171847 A1 | 9/2003 | Cheng et al. | |
| 2005/0143858 A1 | 6/2005 | Jerregard et al. | |
| 2005/0159840 A1 | 7/2005 | Lin et al. | |
| 2008/0090301 A1 * | 4/2008 | Smith | 436/98 |

* cited by examiner

*Primary Examiner* — Ronnie Mancho

(74) *Attorney, Agent, or Firm* — Fraser Clemens Martin & Miller LLC; William J. Clemens

(57) ABSTRACT

A method of controlling robot motion for small shape generation is provided. The method includes the steps of: a) providing a robot having a plurality of interconnected distal links with a respective plurality major axes and a respective plurality of minor axes, the robot having a controller for moving the robot to a starting position and along a path including a series of interpolated positions to be followed relative a workpiece; b) moving the robot to the starting position; c) determining a next interpolated position on the path, wherein the robot remains fixed in position about at least one of the major axes and a location and an approach vector of the next interpolated position can be achieved; and d) moving the robot to the next interpolated position. A method where the robot remains fixed in position about all major axes is also provided.

17 Claims, 6 Drawing Sheets

METHOD OF CONTROLLING A ROBOT FOR SMALL SHAPE GENERATION

CROSS REFERENCE TO RELATED APPLICATION

This application claims the benefit of U.S. Provisional Application Ser. No. 61/027,627, filed on Feb. 11, 2008. The disclosure of the above application is hereby incorporated herein by reference.

FIELD OF THE INVENTION

The present invention relates generally to a system and method for controlling industrial robots and, in particular, a system and method for generating small shape cutting motions with industrial robots.

BACKGROUND OF THE INVENTION

Industrial robot motion involving a generation of small shapes and features presents a different set of problems than traditional robot motion. Small motion is much more affected by friction, backlash, and other sources of lost motion. This effect is more pronounced on the major axes, especially where backlash is not biased to one direction by the effects of gravity, e.g., at a first axis associated with a robot base secured to a floor.

Various methods have been attempted to mitigate the effects of friction, backlash, and other sources of lost motion. One known method relies on fixing the major axes and most minor axes, and moving only one or more of the wrist axes. While this eliminates the major source of path error in short moves, a side effect is that the robot's path cannot generally be maintained. Applications such as water jet cutting have had some tolerance for path deviation, as long as the deviation is along the tool approach vector. However, the known applications with tolerance for path deviation still sacrifice orientation.

Further known methods for controlling robot motion involving small shapes and features are described, for example, in U.S. Pat. No. 7,209,802 to Jerregard et al., U.S. Pat. No. 6,064,168 to Tao et al., and U.S. Pat. No. 4,969,722 to Akeel, the entire disclosures of which are hereby incorporated herein by reference.

U.S. Pat. No. 7,209,802 to Jerregard et al. discloses a method for controlling a robot wherein the procedure is carried out with the robot while maintaining the robot immobile in axes that are not required to carry out the procedure. The method permits operations to be carried out by industrial robots by minimizing the number of axes/shafts that are moved during any procedure. By minimizing or eliminating movement of a shaft or axis, the amount of friction/tolerance that must be accounted for in the procedure is reduced. This allows procedures to be carried out with greater precision. Specifically, one or more of the arms will be immobile about one or more axes of movement during the processing, such as hole cutting. Excluding one or more axes reduces the influence of friction and tolerances for the robot/manipulator when following a given path. Typically, all axes that are not used will be totally inactive or still during a procedure. Best tolerances may be achieved when using as few axes as possible during a procedure. Usually, only one or more axes are moved, which are located closest to the process and/or tool.

The Jerregard et al. method specifically describes cutting a circular hole in a workpiece. Initially, the robot is centered above the origin of the circle. The tool center point (TCP) is moved to coincide with the wrist center point (WCP). All reorientations of the robot will maintain immobile the axes that are to be static or still during the hole cutting. Next, it is determined how the axes that are to be mobile during the hole cutting are to be moved to carry out the hole cutting. For example, a relationship in a first plane is determined between a reorientation angle alpha and a radius of the circle to be cut. This first plane may be the X-Z plane in a XYZ coordinate system. During this measurement, the other axes of the robot may remain stationary. A similar relationship for an angle gamma may then be determined in a second plane. This second plane may be perpendicular to the first plane. This second plane may be the Y-Z plane. During the determination of the relationship between the reorientation angle gamma and the radius, the angle alpha may be held at 0. As the relationships are determined, maximum and minimum values may be determined for each angle. After determining the angles that the relevant axes are displaced to carry out the hole cutting, the hole may be cut.

U.S. Pat. No. 6,064,168 to Tao et al. discloses a method of controlling movement of a robot that includes moving only the wrist portion about two of the wrist axes to achieve a repeated and cyclical movement, such as a back-and-forth movement of the tool relative to a preselected path. Since only the wrist is moved, the range of available tool positions can be determined. In most instances, the desired position of the tool as it deviates from the path is outside of the range of available tool positions, given that only the wrist will move. The method of this invention includes determining a target position within the range of available positions that best corresponds to the desired position of the tool. A unique inverse kinematics solution, which includes fixing one of the wrist axes, is used to determine the wrist orientation required to place the tool into the target position.

In general terms, Tao et al. discloses a method for controlling movement of a tool that is supported by a robot having a wrist that is moveable about a plurality of wrist axes that are associated with a wrist origin. The method includes several basic steps. First, the tool is positioned adjacent a preselected tool path by moving the robot arm into an appropriate orientation. The wrist origin is then moved along a wrist path that corresponds to the preselected tool path. While the wrist origin is moving along the wrist path, the robot wrist moves so that the tool is moved in a first direction away from the preselected tool path. Only the robot wrist moves about at least one of the wrist axes to move the tool away from the path. After the tool has reached a desired distance from the preselected path, it is then moved in a second direction back toward the path by moving only the robot wrist. The movement of the tool toward and away from the path is cyclically repeated while the wrist origin moves along the wrist path. The method of Tao et al. achieves a weaving-like motion of a tool such as a welding torch by moving only the robot wrist.

U.S. Pat. No. 4,969,722 to Akeel discloses a device for delivering a collimated beam, such as a laser beam, along a beam path to a workpiece. The device includes a relatively simple focusing lens means to allow the generation of a curve on the workpiece at high speeds and trace curves having various radii on the workpiece. The focusing lens is driven by a single gear mechanism to control both focusing and the radii of the curves traced on the workpiece. The device includes a rotational first axis, a housing means defining an internal cavity and a focusing lens received within the internal cavity and intersecting the first axis for focusing the beam. The lens is rotatably supported on the first axis and has a focal point along a focal axis offset a first distance from the first axis at the lens means. A continuous, unobstructed hollow passage extends along and surrounds the first axis to the lens so that a beam traveling along the first axis is deflected by the lens from the first axis to travel along a focused beam axis inclined with respect to the first and focal axes and to intersect the focal axis at the focal point. Rotation of the lens about the first axis causes the focal point to trace a curve on the workpiece.

Generally, Akeel describes a device having an independent rotational second axis on which the lens is rotatably supported. Rotation of the lens about the second axis varies the distance between the first axis and the focal axis. The lens is supported in a first housing part linearly movable relative to a second housing part along the focal axis. In one embodiment of Akeel, a gear mechanism in cooperation with coupling means drives the first housing part along the focal axis for controlling the location of the focal point relative to the workpiece. The gear rotates the first and second housing parts together about the second axis to vary the first distance between the first and focal axes. A low-cost, low-weight adjustable beam shifting and focusing arrangement is provided. The device has particularly utility in cutting operations, such as metal cutting operations wherein circles have to be cut in metal at high speed. The device is usually associated with control means and feedback sensors that are necessary for the automatic and programmed operation of the device.

Shortcomings of known systems and methods include: limited cutting approach orientation changes; typical cuts tend to have conical sides; the methods work best with thin materials; part Z placement variation causes formation of elliptical holes; the methods work best with tooling with an approach axis close to the wrist center, which causes limited robot reach; the methods are primarily applicable to short moves; and a Z path is not generally maintained by the methods.

There is a continuing need for a system and method that maintains cutting approach orientation, allows formation of cuts with substantially squared sides, works well with thin or thick materials, maintains hole accuracy regardless of part Z coordinate placement, allows use of standard water jet tooling for full robot reach, and maintains the robot path in XYZ coordinates during operation.

SUMMARY OF THE INVENTION

In concordance with the instant disclosure, a system and method that maintains cutting approach orientation, allows formation of cuts with substantially squared sides, works well with thin or thick materials, maintains hole accuracy regardless of part Z coordinate placement, allows use of standard water jet tooling for full robot reach, and maintains the robot path in XYZ coordinates during operation, is surprisingly discovered.

In one embodiment, a method of controlling robot motion for small shape generation includes the steps of: a) providing a robot having a plurality of interconnected distal links with a respective plurality of major axes and a respective plurality of minor axes, the robot having a controller for moving the robot to a starting position and along a path including a series of interpolated positions to be followed relative to a workpiece; b) moving the robot to the starting position; c) determining a next interpolated position on the path, wherein the robot remains fixed in position about at least one of the major axes and wherein a location and an approach vector of the next interpolated position can be achieved; and d) moving the robot to the next interpolated position.

In another embodiment, a method of controlling robot motion for small shape generation includes steps of: a) providing a robot having a plurality of interconnected distal links with a respective plurality of major axes and a respective plurality of minor axes, the robot having a controller for moving the robot to a starting position and along a path including a series of interpolated positions to be followed relative to a workpiece, wherein the robot remains fixed in position about all of the major axes during the movement of the robot: b) fitting the robot with a cutting tool at a wrist of the robot, the cutting tool having an approach vector and a tool center point and the wrist having a wrist center point, the cutting tool having an offset vector from the wrist center point, the offset vector being the location where the cutting of the workpiece occurs during the movement of the robot, wherein the approach vector is aligned with a cutting axis and intersects the offset vector at the location where the cutting of the workpiece occurs during the movement of the robot; c) positioning the wrist center point in a plane offset from a surface of the workpiece where the hole is desired to be cut, wherein a vector defined by a center of the area of the hole to be cut and the wrist center point is not normal to a plane of the hole to be cut in the workpiece; d) generating path data with the controller for at least two of the minor axes as the tool offset vector traces the path forming the hole, the generating of the path data utilizing the geometry of the desired hole shape and the location of the tool center point; and e) moving the robot about the minor axes to trace the path of the hole geometry and simultaneously energizing the cutting tool to cut the workpiece while the robot moves from the starting position to the next interpolated position, wherein the desired hole shape is formed in the workpiece.

In a further embodiment, a robot for small shape generation includes: a plurality of interconnected distal links, each of the distal links movable about one of a plurality of major axes and a plurality of minor axes; a tool disposed on a wrist of one of the distal links; and a controller operative to control movement of the distal links and the tool, the controller moving the robot with a starting position and a path including a series of interpolated positions to be followed relative a workpiece, the controller determining a next interpolated position on the path, wherein the robot remains fixed in position about at least one of the major axes and wherein a location and an approach vector of the next interpolated position can be achieved, the controller moving the robot to the next interpolated position.

DESCRIPTION OF THE DRAWINGS

The above, as well as other advantages of the present disclosure, will become readily apparent to those skilled in the art from the following detailed description when considered in the light of the accompanying drawings in which.

DETAILED DESCRIPTION OF THE INVENTION

Figure 1:
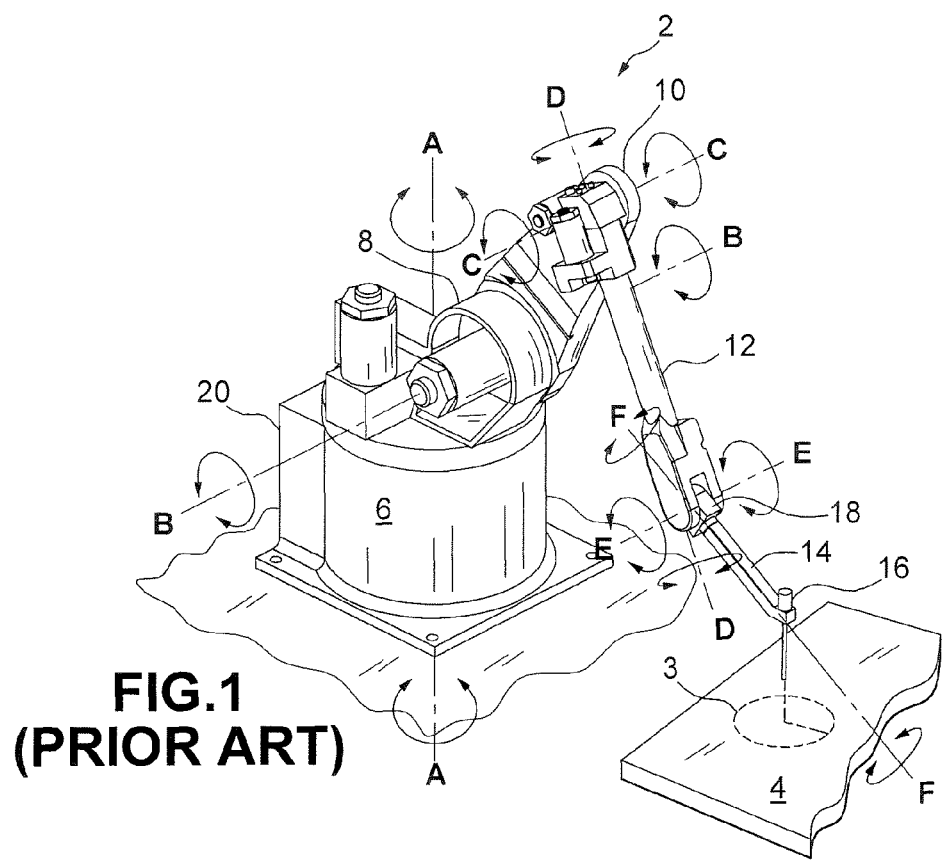
FIG. 1 illustrates a perspective view of a 6-axis method of the prior art, with range of available motion shown by arrows.

The following description is merely exemplary in nature and is not intended to limit the present disclosure, application, or uses. It should be understood that throughout the drawings, corresponding reference numerals also indicate like or corresponding parts and features. In respect of the methods disclosed, the steps presented are exemplary in nature, and thus, are not necessary or critical.

With reference to FIG. 1, a known 6-axis method is shown cutting a circle while maintaining six degrees of freedom. The method is typical in that none of the robot axes are fixed in position, thereby allowing a full freedom of movement by the robot. A cutting tool maintains XYZ coordinate location and approach vector orientation in relation to a workpiece surface. The cutting tool also maintains spin orientation about an approach vector. It is herein appreciated that, for most small shape cutting processes, maintaining the spin about the approach vector is an unnecessary constraint for small shape cutting.

Figure 2:
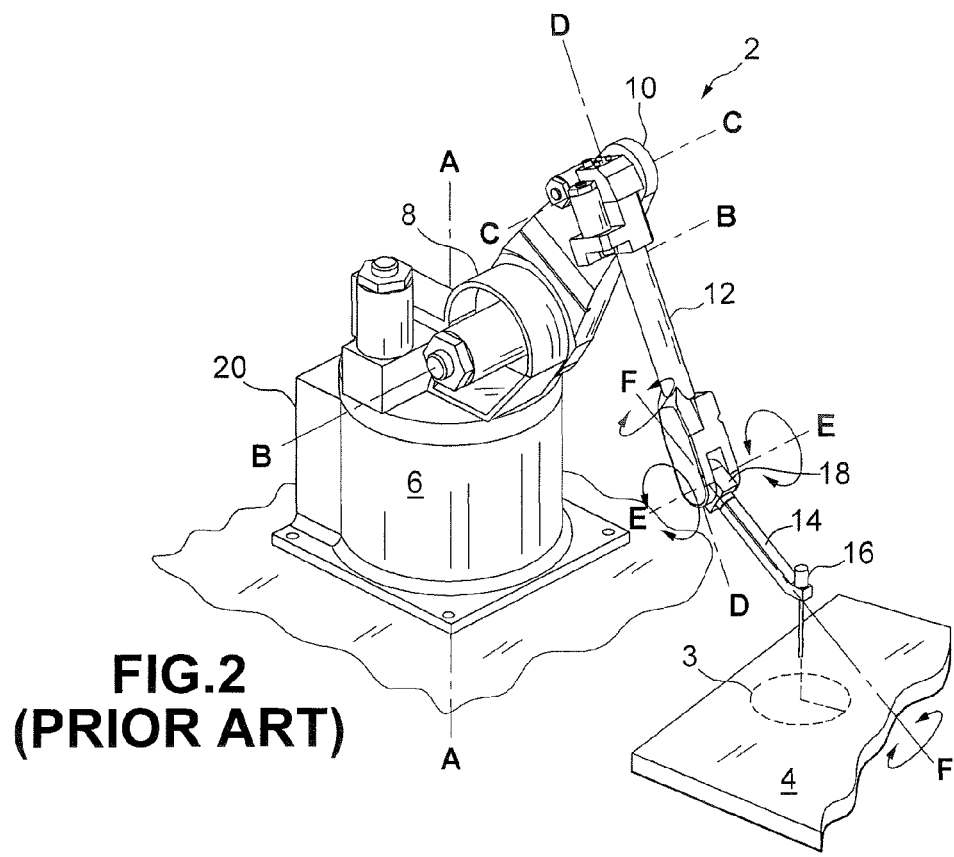
FIG. 2 illustrates a perspective view of the wrist axis method of the prior art, with range of available motion shown by arrows.
Figure 3A:
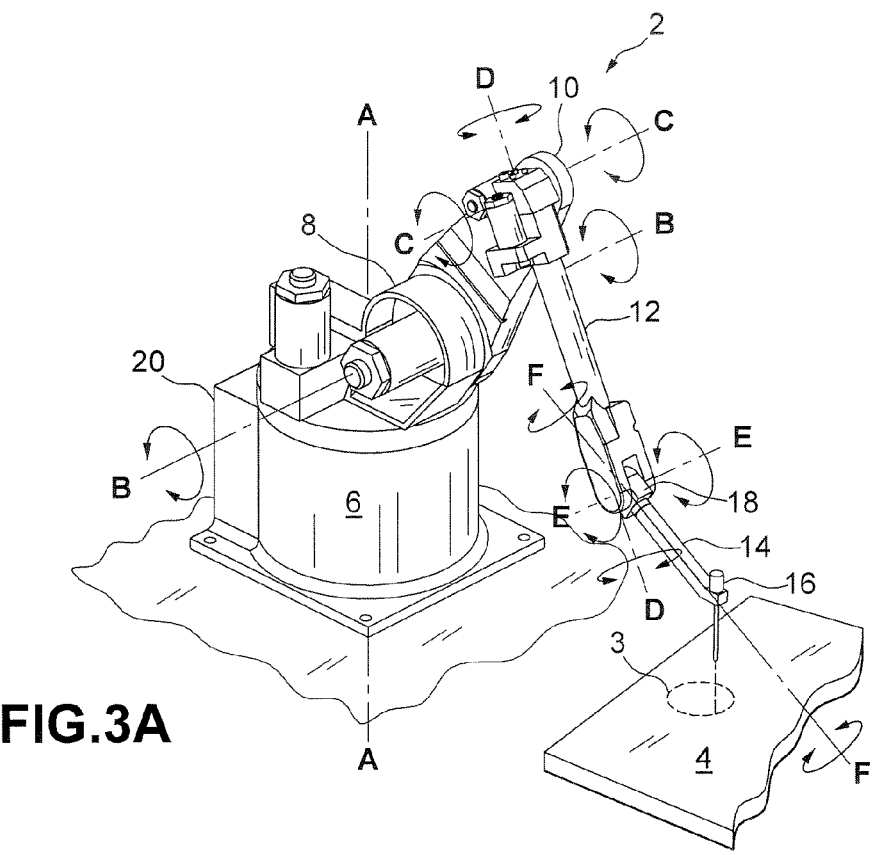
FIGS. 3A to 3D illustrate a perspective view of a 5-axis system and a sequence for small shape generation according to one embodiment of the present disclosure, with range of available motion shown by arrows.
Figure 3B:
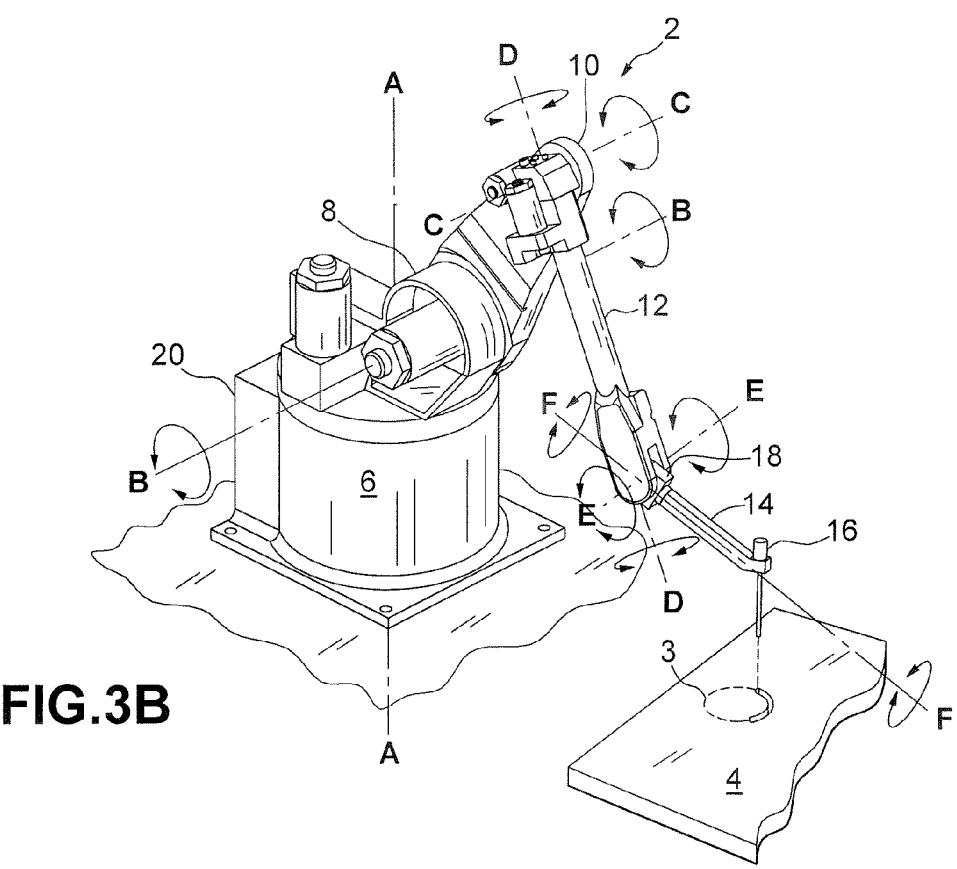
Figure 3C:
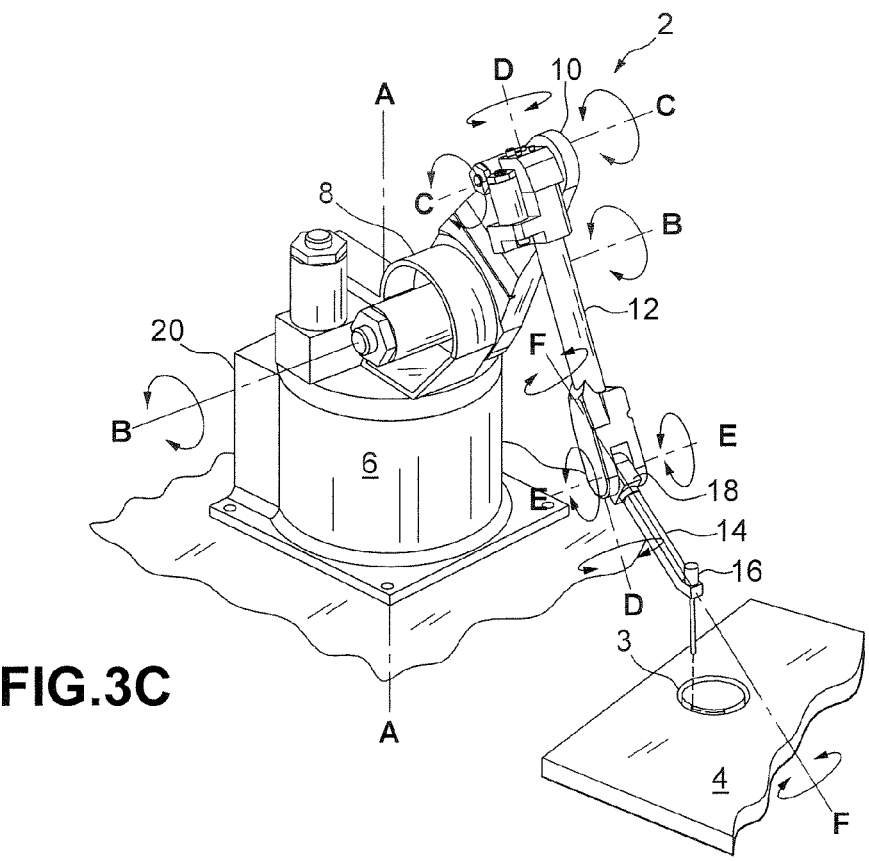
Figure 3D:
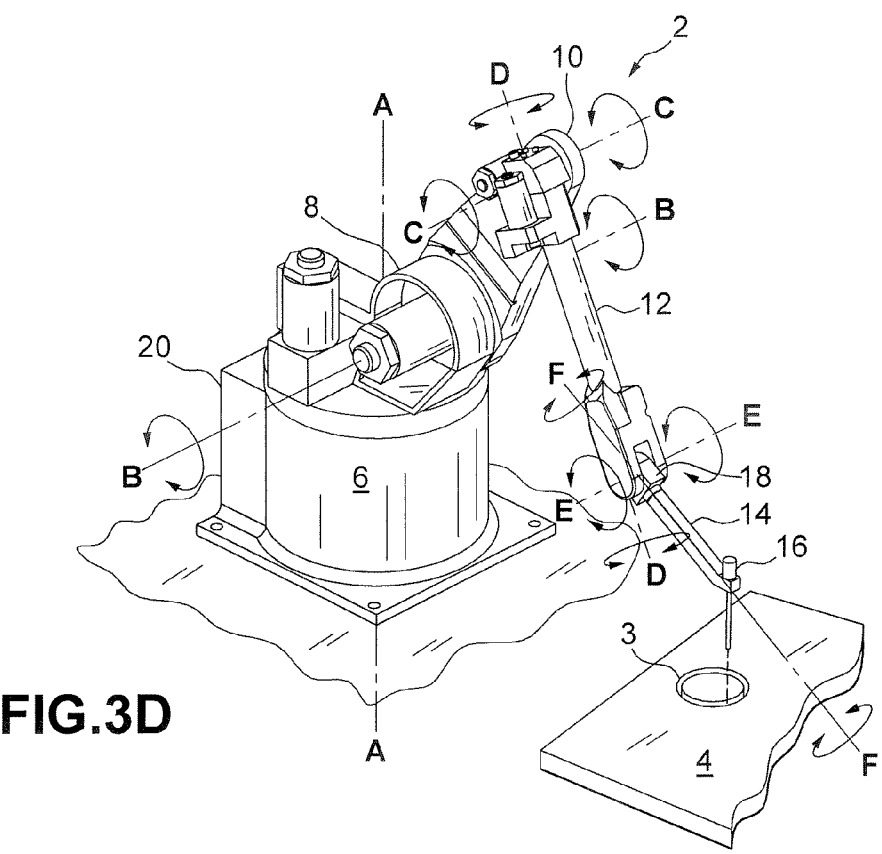
Figure 4A:
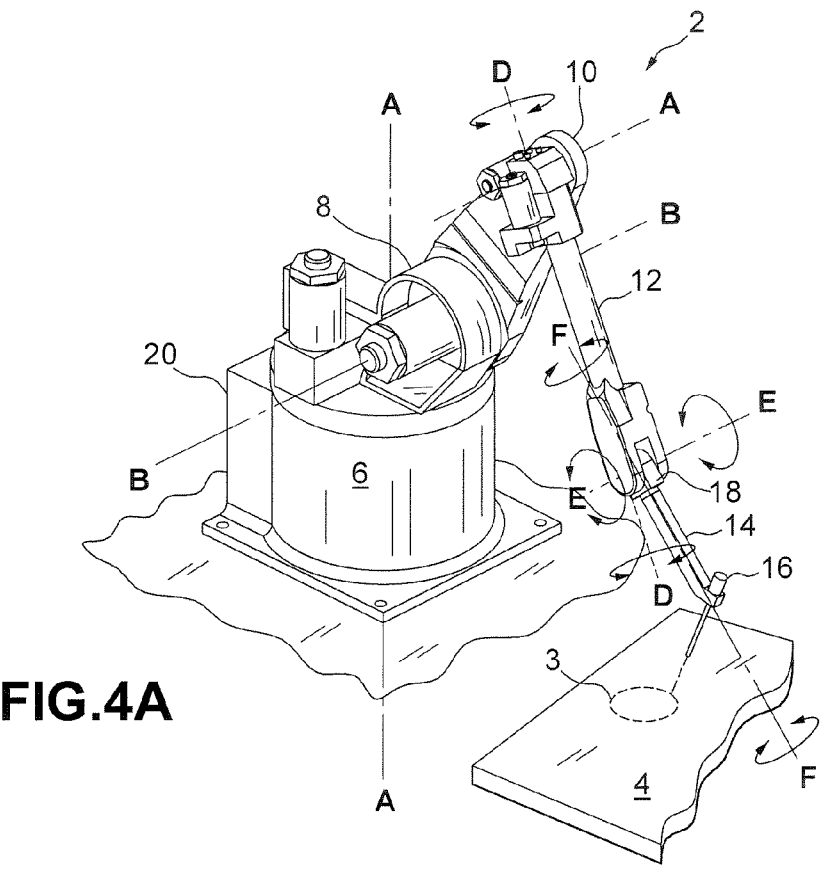
FIGS. 4A to 4D illustrate a perspective view of a 3-axis system and a sequence for small shape generate according to another embodiment of the present disclosure, with range of available motion shown by arrows.
Figure 4B:
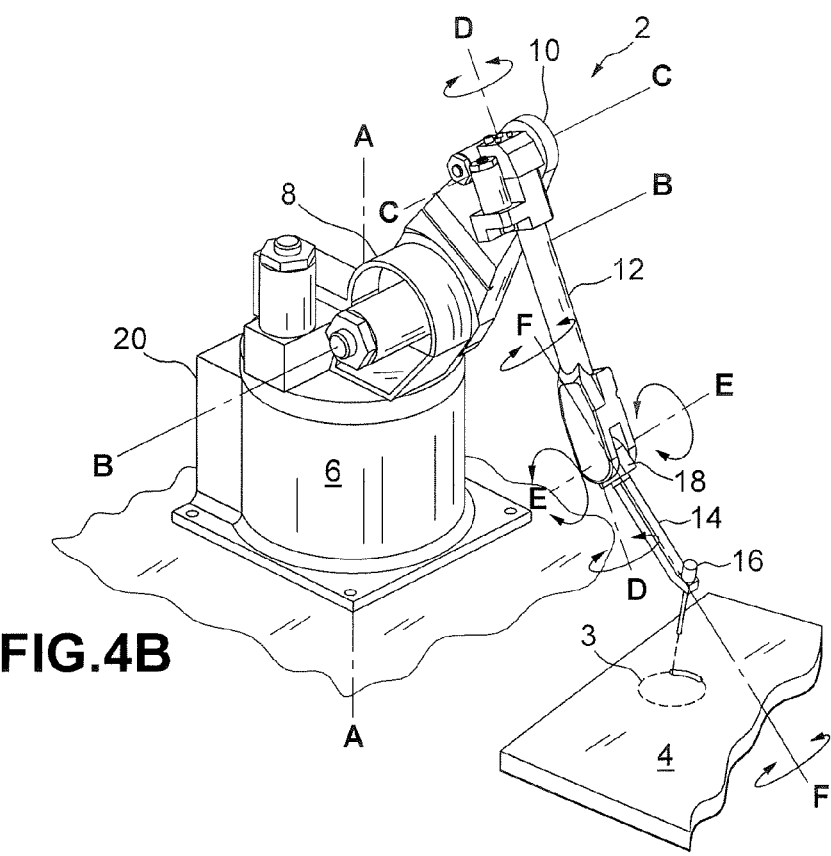
Figure 4C:
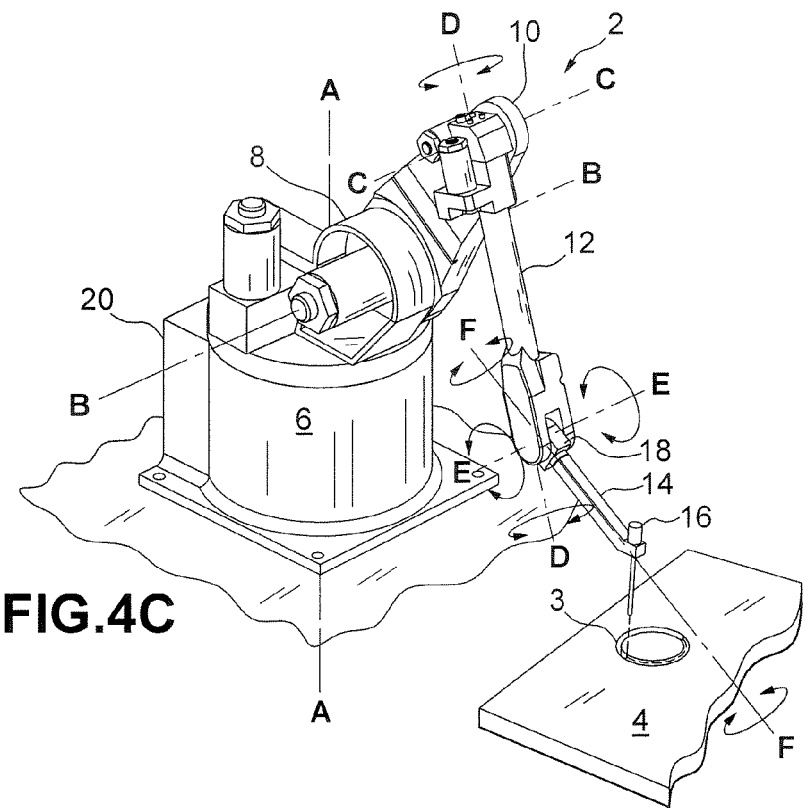
Figure 4D:
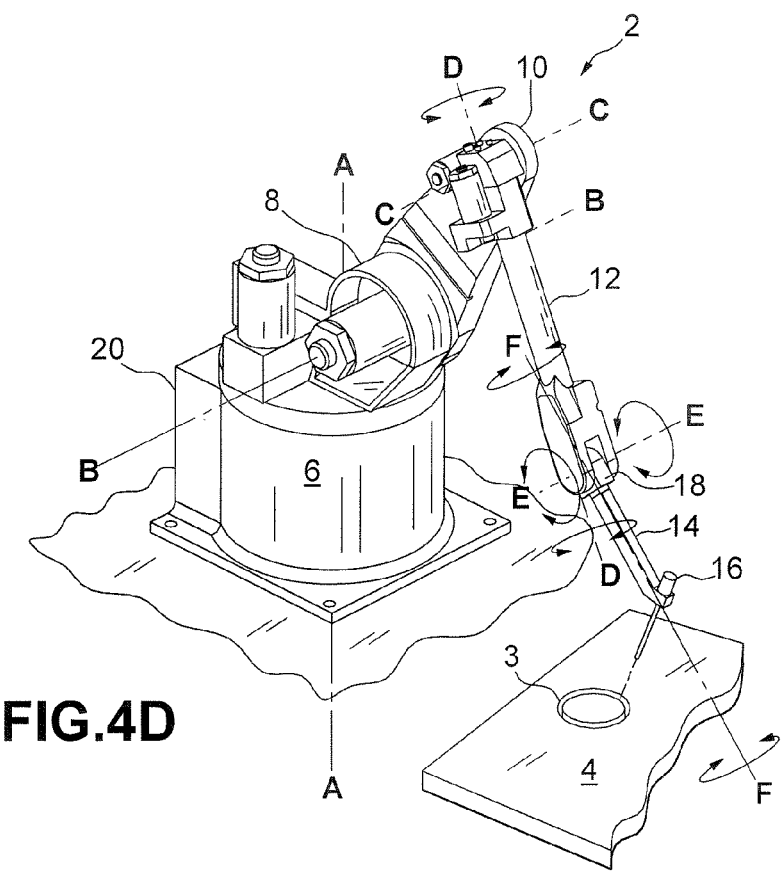

Referring to FIG. 2, a known wrist axis method is shown cutting a circle while all major axes are fixed and only the wrist axes generate motion. Because the wrist orientation varies greatly, a large circle may not be practically cut using the known method. The tool center point is not maintained on the path, although the cutting axis passes through the surface on the desired circle. The known method requires significant tolerance along the cutting axis or approach vector. This method is not generally suitable for such applications that do not have such a tolerance, for example, laser cutting. It is further recognized that the offset of a tool approach vector from a wrist center point increases the orientation error using this method. Thus, the known method is practical only where the tool approach vector passes close to the wrist center point.

As now shown in FIGS. 3A to 3D, a 5-axis system according to the present disclosure includes a robot 2 configured for small shape generation, for example, configured to cut a desired small shape 3 into a workpiece 4. Although the shape 3 shown is substantially circular, it should be appreciated that the cutting of other small shapes 3 are within the scope of the present disclosure. As a nonlimiting example, the robot 2 may have a base 6 and a plurality of interconnected distal links 8, 10, 12, 14 that allow the robot 2 to move to a commanded position in five degrees of freedom. The distal links 8, 10, 12, 14 are movable, respectively, about at least one of a plurality of major axes (herein referred to as major axes A, B, and C; also known in the art as Axis 1, Axis 2, and Axis 3) and a plurality of minor axes (herein referred to as minor axes D, E, and F; also known in the art as Axis 4, Axis 5, and Axis 6) of the robot 2. The robot 2 further includes a tool 16, such as a cutting tool or a deburring tool, as are known in the art. The tool 16 has an approach vector and a tool center point. The wrist 18 has a wrist center point. The tool 16 may be disposed on a wrist 18 on one of the distal links 16.

The system and method includes a controller 20 operative to control movement of the base 6, the distal links 8, 10, 12, 14, the tool 16, and the wrist 18. The controller 20 is configured to move the robot 2 to a starting position and along a path, including a series of interpolated positions to be followed relative to the workpiece 4.

One of ordinary skill in the art should understand that, in the 6-axis robot design, the major axes are the three axes closest to the base 6 and the minor axes are the three axes closest to the tool 16. In general, the major axes A, B, and C primarily provide the location component of the robot 2 position. The minor axes D, E, and F primarily provide the orientation component of the robot 2 position. In the system and method of the present disclosure, the location component that typically has been provided by the major axes A, B, and C is provided, at least in part, by the minor axes D, E, and F as described further herein.

In a particular embodiment, the robot 2 is fixed in position about at least one of the major axes A, B, and C, for example, about the first major axis A relative the base 6 of the robot 2. In a particular embodiment, the robot 2 is fixed in position about only the first major axis A. It should be understood that in methods known in the art, the first major axis A is the dominant source of error due to lost motion, particularly when a velocity becomes very small or the robot 2 changes direction. Where the minor axes D, E, and F have redundancies with one or more of the major axes A, B, and C, the fixing of the robot 2 position about at least one of the major axes A, B, and C is allowed, and the typical fine movement errors associated with the major axes A, B, and C are militated against. Although the present method is shown in relation to the first major axis A being a vertical axis, it should be appreciated that fixing the position of one of the other major axes B and C is also within the scope of the present disclosure. Likewise, it should be understood that an orientation of the desired small shape 3 and an orientation of the robot 2 are not limited with respect to gravity in the present disclosure.

The present disclosure includes a method for controlling motion of the robot 2 for small shape generation. The method includes the step of providing the robot 2 as described hereinabove. The robot 2 is moved to the starting position. Following the movement of the robot 2 to the starting position, the robot 2 is caused to remain fixed in a position about at least one of the major axes, and particularly the first major axis A. A next interpolated position on the path is then determined, where a location and an approach vector of the next interpolated position can be achieved with the robot 2 remaining fixed in position about the at least one major axis A, B, and C. The robot 2 is then moved to the next interpolated position. The approach vector may be substantially parallel to at least one of the major axes A, B, and C about which the robot 2 remains fixed in position. The steps of determining the next interpolated position and moving the robot 2 to the next interpolated position are repeated until the path is completed.

A skilled artisan understands that knowing the offset vector, the approach vector, the tool center point, and the geometry of the desired shape 3 are sufficient for generation of the path for the robot 2 movement. In certain embodiments, the step of determining the next interpolated position for the path can be truncated. For example, only the location of the next interpolated position that can be achieved may be determined in the step of determining the next interpolated position. In another example, only a partial location and the approach vector of the next interpolated position that can be achieved are determined in the step of determining the next interpolated position. The step of determining the next interpolated position on the path may further utilize the known geometry of the desired small shape 3 and the location the tool center point to generate the path data for two or more of the minor axes D, E, and F, about which the robot 2 moves. It should be appreciated that the movement of the robot 2 along the path may be facilitated more quickly and smoothly when the next interpolated position is determined thusly.

The method of the present disclosure may further include the steps of fitting the robot 2 with the tool 16 at the wrist 18 of the robot 2, and simultaneously energizing the tool 16 as the robot 2 moves along the path. Where the tool 16 is the cutting tool, such as the water jet cutting tool or the laser jet cutting tool, the energized tool 16 cuts the workpiece 4 while the robot 2 moves from the starting position to the next interpolated position. The desired shape 3 may thereby be formed in the workpiece 4. In an alternative embodiment, where the tool 16 is a deburring tool, the energized tool 16 may remove burrs on a surface of the workpiece 4. A skilled artisan should appreciate that other types of the tool 16 may also be employed, as desired.

In an illustrative embodiment, the tool 16 may have an offset vector from the wrist center point. The offset vector may be the location where the cutting of the workpiece 4 occurs during the movement of the robot 2. For example, where the approach vector of the tool 16 is aligned with a cutting axis, the approach vector intersects the offset vector at the location where the cutting of the workpiece 4 occurs during the movement of the robot 2.

Where the tool 16 is a cutting tool, the small shape 3 to be cut into the workpiece 4 may be any shape as desired. As a nonlimiting example, the desired small shape 3 may be a substantially circular hole in the workpiece 4. The approach vector of the tool 16 is maintained substantially normal with respect to a surface of the workpiece 4 throughout the movement of the robot 2. Advantageously, where only one of the major axes is fixed according to the present method, the small shapes 3 may be defined by sides cut into the workpiece 4 that are substantially normal with respect to the surface of the workpiece 4. The sides of the small shapes 3 are not conical as is provided with known methods where the movements of the robot 2 are only provided about minor axes such as the wrist axes. Likewise, it should be appreciated that holes generated according to the present method are not elliptical.

The 5-axis method of the present disclosure overcomes the problems of the prior art by fixing only one of the major axes A, B, and C, such as the vertical first major axis A. The other major axes B and C of the robot 2 are thereby allowed to move in the vertical plane. The path and orientation deviation typically associated with the backlash of the fixed major axes A, B, and C are thereby militated against.

Referring now to FIGS. 4A to 4D, a 3-axis system according to another embodiment of the present disclosure includes the robot 2 remaining fixed in position about all of the major axes A, B, and C during the movement of the robot 2. As shown, the step of moving the robot 2 to the next interpolated position along the path includes moving the robot about the minor axes. For example, the wrist 18 of the robot 2 may be moved about the wrist axes. Like the embodiment shown in FIGS. 3A to 3D, the dominant source of error due to lost motion when the velocity become very small or changes direction is thereby militated against.

In an illustrative embodiment according to the present disclosure, the method of controlling the robot 2 motion for small shape generation first includes the step of providing the robot 2 having the plurality of interconnected distal links 8, 10, 12, 14 with the respective plurality of major axes A, B, and C and the respective plurality of minor axes D, E, and F. The robot 2 has the controller 20 for moving the robot 2 to the starting position and along the path including a series of interpolated positions to be followed relative the workpiece 4. The robot 2 remains fixed in position about all of the major axes A, B, and C during the movement of the robot 2.

The method further includes the step of fitting the robot 2 with the cutting tool 16 at the wrist 18 of the robot 2. The cutting tool 16 has the approach vector and the tool center point and the wrist 18 having the wrist center point. The cutting tool 16 has the offset vector from the wrist center point, the offset vector being the location where the cutting of the workpiece 4 occurs during the movement of the robot 2. The approach vector is aligned with the cutting axis and intersects the offset vector at the location where the cutting of the workpiece 4 occurs during the movement of the robot 2.

The wrist center point is then positioned in a plane offset from the surface of the workpiece 4 where the shape 3 is desired to be cut. A vector defined by a center of the area of the shape 3 to be cut and the wrist center point is not normal to a plane of the shape 3 to be cut. For example, where the shape 3 is a circular hole being cut in a horizontal plane, the wrist center point is not centered above the origin of the hole to be cut in the workpiece 4. Path data is generated with the controller 20 for at least two of the minor axes D, E, and F as the tool offset vector traces the path forming the shape 3. The step of generating the path data may utilize the geometry of the desired shape 3 and the location of the tool center point.

The method further includes the step of moving the robot 2 about the minor axes D, E, and F to trace the path of the shape 3 geometry. The cutting tool 16 may be simultaneously energized to cut the workpiece 4 while the robot 2 moves from the starting position to the next interpolated position. The desired shape 3 is thereby formed in the workpiece 4.

One of ordinary skill in the art should appreciate that there are various ways to fix the position of the robot 2 about the first major axis A and achieve a position constrained by XYZ coordinate position and the approach vector orientation, as described herein. For example, the present method may includes the steps of: determining a target position constrained by six degrees of freedom, determining the six robot joint angles associated with the target position; and rotating the robot 2 about the approach vector until a target major axis reaches the fixed joint angle associated with the target position. Other means for fixing the position of the robot 2 may also be employed, as desired.

Advantageously, the tool center point is maintained on the desired path, and the approach vector is maintained, throughout the present method. A spin about the approach vector may be employed to compensate for the missing motion of the robot 2 about the at least one major axis A, B, and C. It should be understood that the present method may be particularly useful where the tool 16 has a significant offset between the approach vector and the wrist center point. As a nonlimiting example, the significant offset between the approach vector and the wrist center point of the tool 16 is employed in conventional water jet tools used in industry. The significant offset between the approach vector and the wrist center point of the tool 16 further provides the advantage of increasing a reach of the robot 2.

Figure 5:
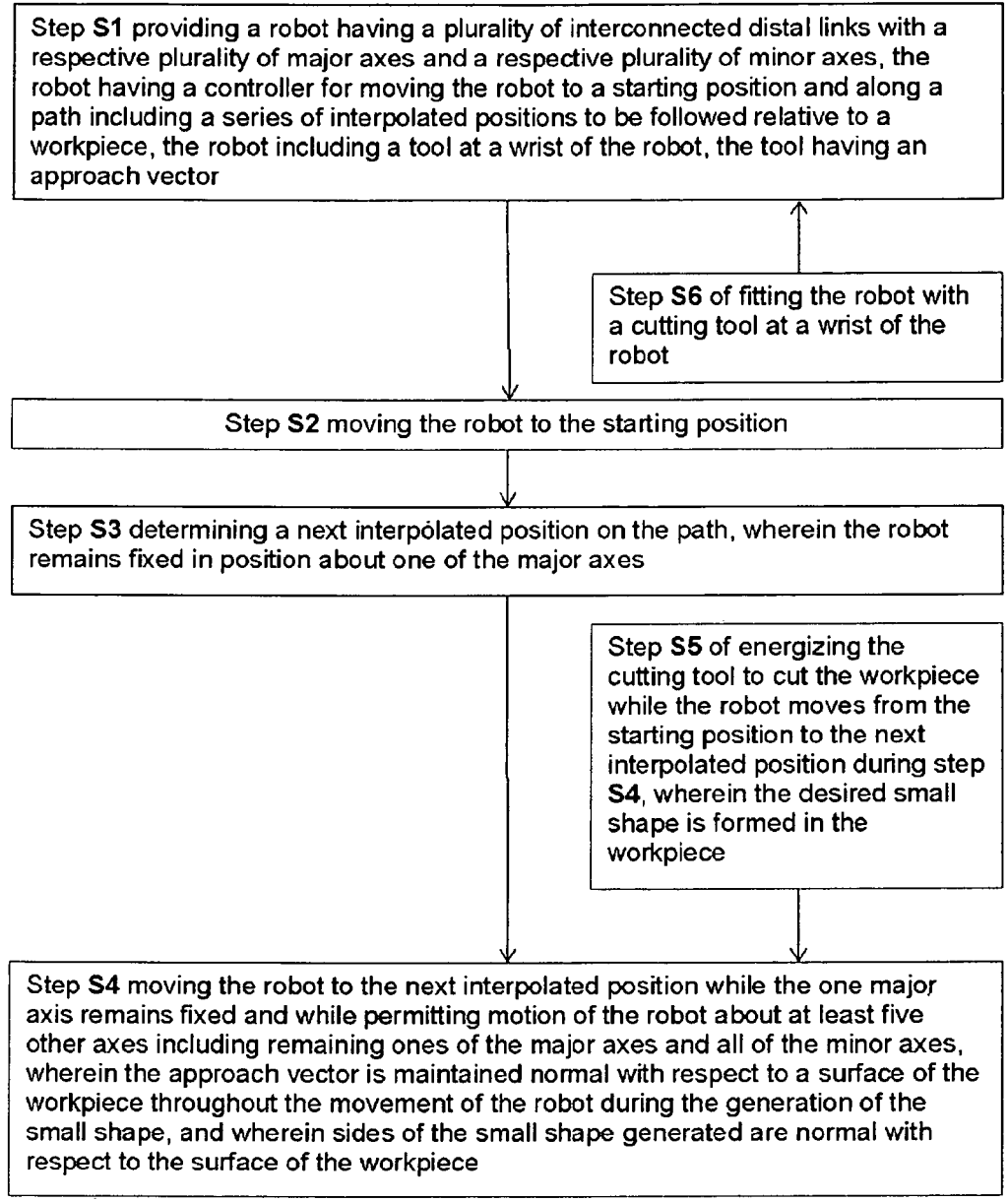
FIG. 5 is a flow diagram of the method of operation according to the invention.

In summary, the method of controlling robot motion for small shape generation comprising the following steps shown in FIG. 5: step S1 providing a robot having a plurality of interconnected distal links with a respective plurality of major axes and a respective plurality of minor axes, the robot having a controller for moving the robot to a starting position and along a path including a series of interpolated positions to be followed relative to a workpiece, the robot including a tool at a wrist of the robot, the tool having an approach vector; step S2 moving the robot to the starting position; step S3 determining a next interpolated position on the path, wherein the robot remains fixed in position about one of the major axes; and step S4 moving the robot to the next interpolated position while the one major axis remains fixed and while permitting motion of the robot about at least five other axes including remaining ones of the major axes and all of the minor axes, wherein the approach vector is maintained normal with respect to a surface of the workpiece throughout the movement of the robot during the generation of the small shape, and wherein sides of the small shape generated are normal with respect to the surface of the workpiece. The method further comprises step S5 of energizing the cutting tool to cut the workpiece while the robot moves from the starting position to the next interpolated position during step S4, wherein the desired small shape is formed in the workpiece. The step S4 of moving the robot to the next interpolated position can include moving the wrist of the robot about at least one of the minor axes. The step S3 of determining a next interpolated position on the path can include utilizing the geometry of the desired small shape and the location of the tool center point to generate the path data for two or more of the minor axes. The robot remains fixed in position about all of the major axes during the movement of the robot in the step S4. The step S1 can include a step S6 of fitting the robot with a cutting tool at a wrist of the robot, the cutting tool having an approach vector and a tool center point and the wrist having a wrist center point, the cutting tool having an offset vector from the wrist center point, the offset vector being the location where the cutting of the workpiece occurs during the movement of the robot, wherein the approach vector is aligned with a cutting axis and intersects the offset vector at the location where the cutting of the workpiece occurs during the movement of the robot.

The system and method of the present disclosure results in more accurate robot 2 movements, facilitating the generation of small shapes 3 such as circular holes, and also results in faster machining and hole cutting.

While certain representative embodiments and details have been shown for purposes of illustrating the invention, it will be apparent to those skilled in the art that various changes may be made without departing from the scope of the disclosure, which is further described in the following appended claims.

What is claimed is:

1. A method of controlling robot motion for small shape generation, the method comprising the steps of:
   a) providing a robot having a plurality of interconnected distal links with a respective plurality of major axes and a respective plurality of minor axes, the robot having a controller for moving the robot to a starting position and along a path including a series of interpolated positions to be followed relative to a workpiece, the robot including a tool at a wrist of the robot, the tool having an approach vector;
   b) moving the robot to the starting position;
   c) determining a next interpolated position on the path, wherein the robot remains fixed in position about one of the major axes further, wherein determining a next interpolated position on the path includes utilizing a geometry of the small shape and a location of the tool center point to generate path data for two or more of the minor axes; and
   d) moving the robot to the next interpolated position while the one major axis remains fixed and while permitting motion of the robot about at least five other axes including remaining ones of the major axes and all of the minor axes, wherein the approach vector is maintained normal with respect to a surface of the workpiece throughout the movement of the robot during the generation of the small shape, and wherein sides of the small shape generated are normal with respect to the surface of the workpiece.

2. The method of claim 1, wherein the robot has three major axes, including a first major axis about which the entire robot is configured to move.

3. The method of claim 2, wherein the first major axis is a vertical axis associated with a base of the robot mounted on a floor.

4. The method of claim 2, wherein the robot remains fixed in position only about the first major axis during the movements of the robot along the path.

5. The method of claim 1, wherein the approach vector is substantially parallel to the one of the major axes about which the robot remains fixed in position.

6. The method of claim 1, wherein the tool is a cutting tool, the cutting tool having a tool center point and the wrist having a wrist center point.

7. The method of claim 6, further comprising the step of energizing the cutting tool to cut the workpiece while the robot moves from the starting position to the next interpolated position, wherein the desired small shape is formed in the workpiece.

8. The method of claim 6, wherein the cutting tool is one of a water jet cutting tool and a laser cutting tool.

9. The method of claim 6, wherein the cutting tool has an offset vector from the wrist center point, the offset vector being the location where the cutting of the workpiece occurs during the movement of the robot.

10. The method of claim 6, wherein the desired small shape is a substantially circular hole in the workpiece, wherein the hole is defined by sides cut into the workpiece that are substantially normal with respect to a surface of the workpiece.

11. The method of claim 1, wherein the step of moving the robot to the next interpolated position includes moving the wrist of the robot about at least one of the minor axes.

12. The method of claim 1, wherein the robot remains fixed in position about all of the major axes during the movement of the robot.

13. The method of claim 1, wherein the tool is a deburring tool, the deburring tool having a tool center point and the wrist having a wrist center point.

14. The method of claim 13, further comprising the step of energizing the deburring tool to treat the workpiece while the robot moves from the starting position to the next interpolated position, wherein the workpiece is deburred.

15. The method of claim 1, wherein a desired orientation of the approach vector with respect to the surface of the workpiece is achieved throughout the movement of the robot during the generation of the small shape.

16. A method of controlling robot motion for small shape generation, the method comprising the steps of:
   a) providing a robot having a plurality of interconnected distal links with a respective plurality of major axes and a respective plurality of minor axes, the robot having a controller for moving the robot to a starting position and along a path including a series of interpolated positions to be followed relative a workpiece wherein determining a next interpolated position on the path includes utilizing a geometry of the small shape and a location of a tool center point, wherein the robot remains fixed in position about one of the major axes during the movement of the robot while permitting movement about at least five other axes including remaining ones of the major axes and all of the minor axes;
   b) fitting the robot with a cutting tool at a wrist of the robot, the cutting tool having an approach vector and a tool center point and the wrist having a wrist center point, the cutting tool having an offset vector from the wrist center point, the offset vector being the location where the cutting of the workpiece occurs during the movement of the robot, wherein the approach vector is aligned with a cutting axis and intersects the offset vector at the location where the cutting of the workpiece occurs during the movement of the robot;
   c) positioning the wrist center point in a plane offset from a surface of the workpiece where the hole is desired to be cut, wherein a vector defined by a center of an area of the hole to be cut and the wrist center point is not normal to a plane of the hole to be cut in the workpiece;

d) generating path data with the controller for at least two of the minor axes as the tool offset vector traces the path forming the hole, the generating of the path data utilizing the geometry of the desired hole shape and the location of the tool center point; and e) moving the robot about remaining ones of the major axes and about the minor axes to trace the path of the hole geometry and simultaneously energizing the cutting tool to cut the workpiece while the robot moves from the starting position to the next interpolated position, wherein the desired hole shape is formed in the workpiece, wherein the approach vector is maintained normal with respect to the surface of the workpiece throughout the movement of the robot during the generation of the small shape, and wherein sides of the small shape generated are normal with respect to the surface of the workpiece.

17. A robot for small shape generation, comprising;

a plurality of interconnected distal links, each of the distal links movable about one of a plurality of major axes and a plurality of minor axes;

a tool disposed on a wrist of one of the distal links, the tool having an approach vector; and a controller operative to control movement of the distal links and the tool, the controller moving the robot with a starting position and a path including a series of interpolated positions to be followed relative a workpiece, the controller determining a next interpolated position on the path wherein determining a next interpolated position on the path includes utilizing a geometry of the small shape and a location of a tool center point to generate path data for two or more of the minor axes, wherein the robot remains fixed in position about one of the major axes, the controller moving the robot to the next interpolated position while permitting motion of the robot about at least five other axes including remaining ones of the major axes and all of the minor axes, wherein the approach vector is maintained normal with respect to a surface of the workpiece throughout the movement of the robot during the generation of the small shape, and wherein sides of the small shape generated are normal with respect to the surface of the workpiece.

* * * * *